United States Patent
Takahashi

(10) Patent No.: US 11,853,041 B2
(45) Date of Patent: *Dec. 26, 2023

(54) ANOMALY DETECTION DEVICE, ANOMALY DETECTION METHOD, AND RECORDING MEDIUM

(71) Applicant: NEC Corporation, Tokyo (JP)

(72) Inventor: Tsubasa Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,912

(22) Filed: Jul. 13, 2022

(65) Prior Publication Data

US 2022/0404805 A1    Dec. 22, 2022

Related U.S. Application Data

(63) Continuation of application No. 16/623,911, filed as application No. PCT/JP2017/022442 on Jun. 19, 2017, now Pat. No. 11,422,538.

(51) Int. Cl.
    *G05B 19/418*      (2006.01)
    *G06F 7/58*        (2006.01)
    (Continued)

(52) U.S. Cl.
    CPC ..... *G05B 19/4185* (2013.01); *G05B 19/4183* (2013.01); *G05B 19/41885* (2013.01);
    (Continued)

(58) Field of Classification Search
    CPC ............ G05B 19/4185; G05B 19/4183; G05B 19/41885; G06F 7/58; G06F 11/3072;
    (Continued)

(56) References Cited

U.S. PATENT DOCUMENTS

| 6,256,552 B1 * | 7/2001 | Aoki ................ G05B 19/40937 |
| | | 700/175 |
| 9,026,719 B2 | 5/2015 | Hyde ..................... G06F 11/34 |
| | | 711/103 |

(Continued)

FOREIGN PATENT DOCUMENTS

| JP | 2011-070835 A | 4/2011 |
| JP | 2011-247696 | 12/2011 |

(Continued)

OTHER PUBLICATIONS

Takahashi et al., "AutoCyclone: Automatic Mining of Cyclic Online Activities with Robust Tensor Factorization", Proceedings of the 26th International Conferencee on World Wide Web, Apr. 3-7, 2017, pp. 213-221.

(Continued)

*Primary Examiner* — James C Kerveros
(74) *Attorney, Agent, or Firm* — Sughrue Mion, PLLC

(57) ABSTRACT

An information processing device according to the present invention includes: a memory; and at least one processor coupled to the memory. The processor performing operations. The operations includes: constructing second data that is acquired, based on first data containing a plurality of observation values in a plurality of times, by stacking the first data with respect to the times, and extracting a constant pattern that is a combination of the observation values having temporal constancy in the first data, based on the second data; generating a difference between the first data and the constant pattern in the time; and extracting a random pattern that is a combination of the observation values without temporal constancy, based on the difference.

9 Claims, 12 Drawing Sheets

(51) Int. Cl.
*G06F 11/30* (2006.01)
*H04L 1/24* (2006.01)

(52) U.S. Cl.
CPC ............ *G06F 7/58* (2013.01); *G06F 11/3072* (2013.01); *H04L 1/24* (2013.01)

(58) Field of Classification Search
CPC . G06F 11/30; G06F 11/34; H04L 1/24; Y02P 90/02
USPC ............................................................ 700/95
See application file for complete search history.

(56) References Cited

U.S. PATENT DOCUMENTS

| | | | |
|---|---|---|---|
| 9,323,599 B1 | 4/2016 | Iyer ..................... | G06F 9/45508 |
| 2009/0043407 A1 | 2/2009 | Mathiesen ......... | G05B 19/4185 |
| | | | 700/48 |
| 2010/0003819 A1 | 1/2010 | Taguchi ................ | H01L 27/118 |
| | | | 438/669 |
| 2012/0227046 A1* | 9/2012 | Park .................... | G06F 11/3438 |
| | | | 718/100 |
| 2012/0290879 A1 | 11/2012 | Shitxiya et al. | |
| 2017/0075685 A1 | 3/2017 | Grant ........................ | G06F 8/70 |
| 2018/0293125 A1 | 10/2018 | Lavid Ben Lulu .. | G05B 23/024 |
| 2020/0150625 A1* | 5/2020 | Yokoyama .............. | B22F 10/80 |
| 2020/0409825 A1* | 12/2020 | Balasubramanian ........................ | |
| | | | G06F 11/302 |
| 2021/0216625 A1* | 7/2021 | Miller ................. | G06F 11/1469 |

FOREIGN PATENT DOCUMENTS

| | | |
|---|---|---|
| JP | 2014-149840 | 8/2014 |
| WO | 2012/133185 A1 | 10/2012 |

OTHER PUBLICATIONS

Yuan et al., "Model selection and estimation in regression with grouped variables", Journal of the Royal Statistical Society: Series B (Statistical Methodology), Feb. 2006, vol. 66, Part 1, pp. 49-67.

Jiang et al., "Anomaly localization for network data streams with graph joint sparse PCA", KDD '11 Proceeding of the 17th ACM SIGKDD international conference on knowlege discovery and data mining, Aug. 21-24, 2011, pp. 886-894.

Mateos et al., "Robust PCA as Bilinear Decompostion With Outler-Sparsity Regulerization", IEEE Transactions on Signal Processing. Oct. 2012, vol. 60, No. 10, pp. 5176-5190.

Kimura, "Analyzing Log Data for Diagnosing Large Network Problems", IEICE Technical Report, Nov. 14, 2014, vol. 114, No. 297, pp. 19-24.

Itai et al., "Nonstationary Signal Separation by Tensor Expansion Applying Absolute Error". The 19th Workshop on Circuits and Systems in Karuizawa, Apr. 25, 2006, pp. 135-140.

International Search Report dated Aug. 29, 2017 in International Application No. PCT/JP2017/022442.

Written Opinion of the International Searching Authority dated Aug. 29, 2017 in International Application No. PCT/JP2017/022442.

* cited by examiner

Fig. 3

| x | msg1 | msg2 | msg3 | msg4 |
|---|---|---|---|---|
| (src1,day1) | ▓ | ▓ | | |
| (src2,day1) | ▓ | | | |
| (src3,day1) | ▓ | | | ▨ |
| (src4,day1) | | | | |
| (src5,day1) | ▨ | | | |
| (src1,day2) | ▓ | ▓ | | |
| (src2,day2) | ▓ | | | |
| (src3,day2) | ▓ | | | |
| (src4,day2) | ▨ | ▨ | | |
| (src5,day2) | | | | |
| (src1,day3) | ▓ | ▓ | | |
| | ▓ | ▓ | | ▨ |
| | | | ▓ | ▓ |
| ⋮ | | | | |
| | | | | |
| | | | ▨ | ▨ |
| | ▓ | ▓ | | |
| (src5,day4) | ▨ | ▨ | | |
| (src1,day5) | ▓ | | ▨ | ▨ |
| (src2,day5) | ▓ | | | |
| (src3,day5) | ▓ | | | |
| (src4,day5) | ▨ | | ▓ | |
| (src5,day5) | | | ▓ | |

▓ : Constant pattern cell

▨ : Random pattern cell

☐ : Other cell

Fig. 9

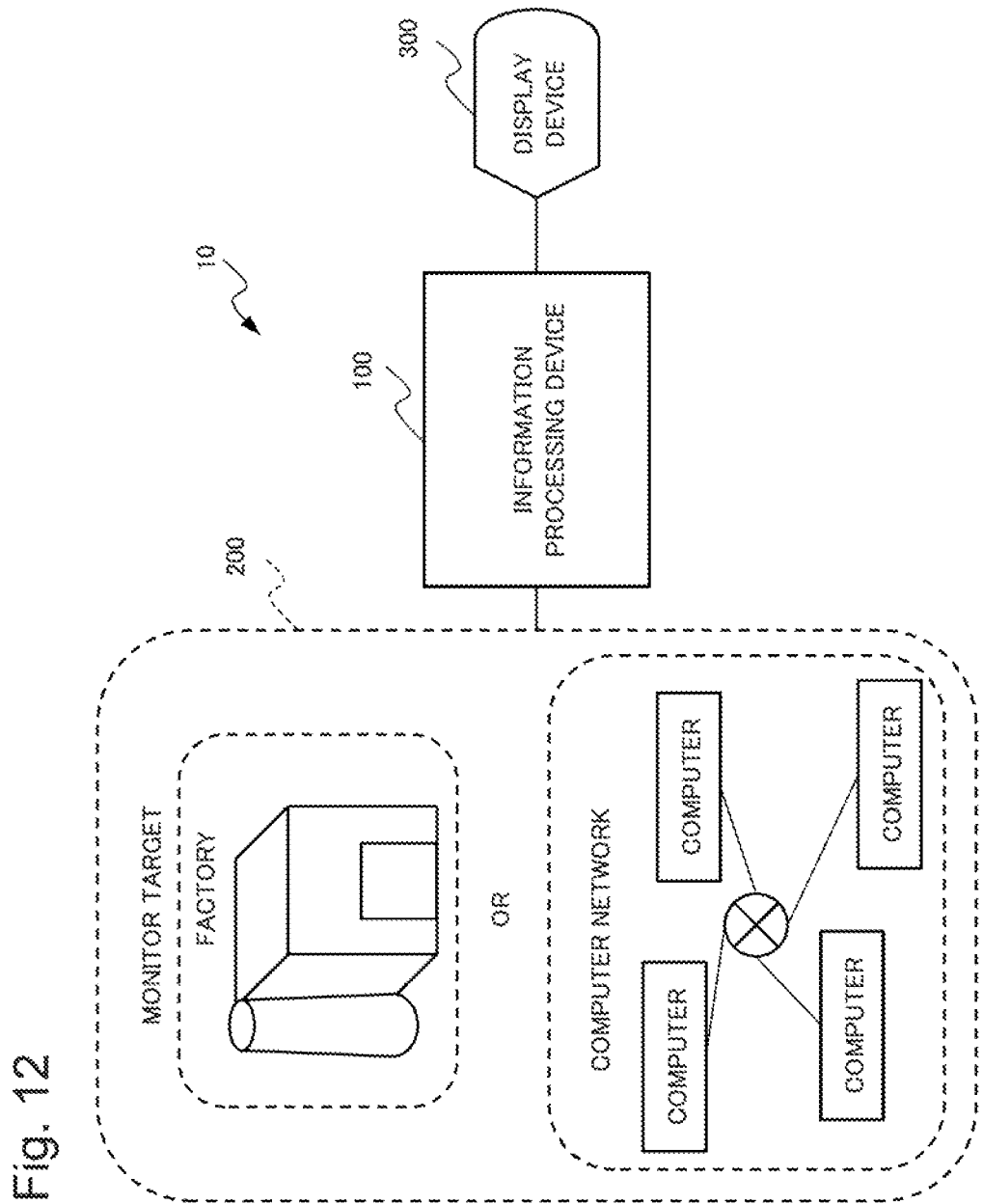

ANOMALY DETECTION DEVICE, ANOMALY DETECTION METHOD, AND RECORDING MEDIUM

CROSS-REFERENCE TO RELATED APPLICATIONS

The present application is a continuation application of U.S. patent application Ser. No. 16/623,911 filed on Dec. 18, 2019, which is a National Stage Entry of international application PCT/JP2017/022442 filed on Jun. 19, 2017, the disclosures of all of which are incorporated in their entirety by reference herein.

TECHNICAL FIELD

The present invention relates to data processing, and more particularly to an information processing device configured to process time-series data, and the like.

BACKGROUND ART

A device that detects intrusion to a network or a sensor device such as a temperature sensor in a factory (hereinafter, collectively referred to as a "detection device") observes a state or a value of a predetermined attribute of a monitor target (a network or a factory). The attribute is a physical value such as a temperature, a pressure, a flow rate, and an oscillation, or a state of an operation such as transmission or reception of data and generation of a predetermined message. Hereinafter, the observed value and the observed state are collectively referred to as "observation values". Moreover, the detection device does not perform observation for a single time, but regularly continues observation in a sequential manner. Based on the sequential observation, the detection device generates, with each passing moment, data containing an observed value of an attribute (an observation value) and information (time stamps) on time such as observation time, which are associated with each other. That is to say, the detection device observes a monitor target, and generates data (hereinafter, referred to as "time-series data" or "sequence data") containing observation values for a plurality of times and time stamps. Further, the detection device analyzes the generated sequence data, and grasps the monitor target. Here, a grasp of the monitor target is, for example, determination whether or not the monitor target is in a normal state, or detection of suspicious behavior of the monitor target.

As examples of the sequence data, a mini-blog (tweet) such as Twitter, a log of a proxy server or a monitor server, and an alert log of an intrusion detection system (IDS) are given.

A technique for processing such sequence data (time-series data) is applied in various fields (Patent Literatures (PTLs) 1 to 3, for example).

PTL 1 discloses a technique for analyzing brain waves.

PTL 2 discloses a technique for learning data in a normal operation state.

PTL 3 discloses a technique for automatically extracting a normal pattern.

In the sequence data, various types of behavior of the monitor target are intermixed. For example, in the sequence data, behavior having temporal constancy and behavior (hereinafter, referred to as "random behavior") without temporal constancy are intermixed in some cases. The behavior having temporal constancy is, for example, "behavior that frequently emerges on a specific day of a week and/or in a specific time band" or "behavior that emerges everyday". Further, the random behavior is "behavior in which an emergence time or location cannot be specified".

In a case of defense (cyber security) against an illegal attack (cyberattack) on a computer network, the behavior having temporal constancy corresponds to an operation relating to a regular duty. Further, the random behavior corresponds to a cyberattack such as a targeted attack, an equipment failure, or some kind of anomaly.

Detecting patterns relevant to the behavior having temporal constancy and the random behavior is important when security equipment that issues an alert (warning) detects anomaly that does not happen regularly.

As described above, when analyzing the sequence data, there is a demand for clearly separating a pattern relevant to the behavior having temporal constancy and a pattern relevant to the random behavior from each other.

As a technique of detecting a main pattern in data, various techniques are proposed. For example, as such technique, matrix decomposition such as a principal component analysis (PCA) or singular value decomposition (SVD) is known. These techniques can also be applied to the sequence data. However, with the matrix decomposition, the behavior having temporal constancy and the random behavior cannot be distinguished from each other. Further, when there are a large number of patterns which are as frequent as the behavior having temporal constancy, the matrix decomposition regards the random behavior as a noise and the random behavior may not be detected as a pattern.

A technique described in Non Patent Literature (NPL) 1 divides and stacks data formed of "time stamp and attribute value" based on period to generate sequence data in a matrix format. Moreover, the technique described in NPL 1 generates a tensor formed of "periodicity, in-period time stamp, and attribute value", based on the sequence data in a matrix form. The tensor generated by periodic stacking as described above, that is, the tensor generated by a time-axis direction stacking, has a new redundancy generated in a time direction. The technique described in NPL 1 applies tensor decomposition to the tensor, and detects a periodic pattern (a pattern relevant to behavior having temporal constancy). In addition, the technique described in NPL 1 detects behavior excluded from the behavior having temporal constancy as an abnormal value.

The calculation of the above-described matrix or the tensor has a large calculation amount, and result values are not converged into one value in some cases. In view of this, in order to reduce the calculation amount and converge the results, a constraint is used. As the constraint in such calculation, regularization is widely used. As such regularization, Sparse regularization is known. Sparse regularization is a constraint in which a large number of variables have values of 0.

NPL 2 discloses Group Lasso regularization being one type of Sparse regularization. With respect to a variable group, Group Lasso regularization is regularization having an effect of crushing variables belonging to the variable group to simultaneously 0, that is, causing values of the variables to be sparse.

NPL 3 generates, through use of Group Lasso, a group of variables including a predetermined number (k) of superordinate components (superordinate k components) in a principal component analysis. In the principal component analysis, a component contains more pieces of principal data as the component becomes superior. Thus, the group of variables (superordinate k components) described above becomes an estimate of a dense pattern containing a large number of features that are commonly shared by a large number of pieces of data, in other words, a pattern that emerges in a large number of pieces of data.

NPL 4 discloses a technique for causing a pattern acquired by a principal component analysis to be robust against an abnormal value through use of Group Lasso regularization.

CITATION LIST

Patent Literature

[PTL 1] International Publication No. WO 2012/133185
[PTL 2] Japanese Unexamined Patent Application Publication No. 2014-149840
[PTL 3] Japanese Unexamined Patent Application Publication No. 2011-247696

Non Patent Literature

[NPL 1] Tsubasa Takahashi, Bryan Hooi, Christos Faloutsos, "AutoCyclone: Automatic Mining of Cyclic Online Activities with Robust Tensor Factorization", Proceedings of the 26th International Conference on World Wide Web, Apr. 3-7, 2017, pp. 213-221
[NPL 2] Ming Yuan, Yi Lin, "Model selection and estimation in regression with grouped variables", Journal of the Royal Statistical Society: Series B (Statistical Methodology), Volume 68, Issue 1, February 2006, pp. 49-67
[NPL 3] Ruoyi Jiang, Hongliang Fei, Jun Huan, "Anomaly localization for network data streams with graph joint sparse PCA", KDD '11 Proceeding of the 17th ACM SIGKDD international conference on Knowledge discovery and data mining, Aug. 21-24, 2011, pp. 886-894
[NPL 4] Gonzalo Mateos, Georgios B. Giannakis, "Robust PCA as Bilinear Decomposition With Outlier-Sparsity Regularization", IEEE Transactions on Signal Processing, Volume 60, Issue 10, October 2012, pp. 5176-5190

SUMMARY OF INVENTION

Technical Problem

However, the technique described in NPL 1 cannot extract a pattern contained in an abnormal value.

Further, the technique described in NPL 1 is devised in such a way as to easily extract a periodic pattern by providing input data with redundancy in a time direction. However, in the technique described in NPL 1, a constraint that causes to extract only a behavior pattern having temporal constancy is not necessarily added to tensor decomposition for extracting a pattern. Thus, in the technique described in NPL 1, even in the case of random behavior, when the random behavior emerges frequently or an observation value relevant to the random behavior is large, for example, a pattern relevant to the random behavior may be mixed with a behavior pattern having temporal constancy.

Further, the superordinate k components disclosed in NPL 3 are merely a group acquired by collecting patterns with features from a whole data set. The superordinate k components are not necessarily an estimate of a behavior pattern having temporal constancy.

NPL 2 is a literature disclosing Group Lasso regularization, and does not disclose a technique for distinguishing a pattern relevant to behavior having temporal constancy and a pattern relevant to random behavior from each other.

NPL 4 discloses a technique for improving robustness of a pattern acquired by a principal component analysis against an abnormal value. However, NPL 4 does not disclose a technique for distinguishing a pattern relevant to behavior having temporal constancy and a pattern relevant to random behavior from each other.

PTLs 1 to 3 do not disclose the above-mentioned technique for distinguishing a behavior pattern having temporal constancy and a random behavior pattern from each other.

As described above, PTLs 1 to 3 and NPLs 1 to 4 have an issue that a pattern relevant to behavior having temporal constancy and a pattern relevant to random behavior cannot be extracted.

An object of the present invention is to solve the above-mentioned issue, and to provide an information processing device and the like that extract a pattern relevant to behavior having temporal constancy and a pattern relevant to random behavior.

Solution to Problem

An information processing device according to one aspect of the present invention, includes:
a memory; and
at least one processor coupled to the memory,
the processor performing operations. The operations includes:
constructing second data that is acquired, based on first data containing a plurality of observation values in a plurality of times, by stacking the first data with respect to the times, and extracting a constant pattern that is a combination of the observation values having temporal constancy in the first data, based on the second data;
generating a difference between the first data and the constant pattern in the time; and
extracting a random pattern that is a combination of the observation values without temporal constancy, based on the difference.

An information processing method according to one aspect of the present invention, includes:
constructing second data that is acquired, based on first data containing a plurality of observation values in a plurality of times, by stacking the first data with respect to the times, and extracting a constant pattern that is a combination of the observation values having temporal constancy in the first data, based on the second data;
generating a difference between the first data and the constant pattern in the times; and
extracting a random pattern that is a combination of the observation values without temporal constancy, based on the difference.

A non-transitory computer-readable recording medium according to one aspect of the present invention embodies a program. The program causes a computer to perform a method. The method includes:
constructing second data that is acquired, based on first data containing a plurality of observation values in a plurality of times, by stacking the first data with respect to the times, and extracting a constant pattern that is a combination of the observation values having temporal constancy in the first data, based on the second data;
generating a difference between the first data and the constant pattern in the times; and
extracting a random pattern that is a combination of the observation values without temporal constancy, based on the difference.

An information processing system according to one aspect of the present invention, includes:

the above-mentioned information processing device;

a monitor target configured to transmit the first data to the information processing device; and a display device configured to receive the random pattern from the information processing device and to display the received random pattern.

Advantageous Effects of Invention

Based on the present invention, a pattern relevant to behavior having temporal constancy and a pattern relevant to random behavior can be extracted.

BRIEF DESCRIPTION OF DRAWINGS

FIG. 3 is a diagram illustrating one example of sequence data.

FIG. 9 is a diagram illustrating a difference acquired by matricizing the individual difference illustrated in FIG. 8.

FIG. 12 is a diagram illustrating one example of an information processing system according to the first example embodiment.

EXAMPLE EMBODIMENT

Figure 1:
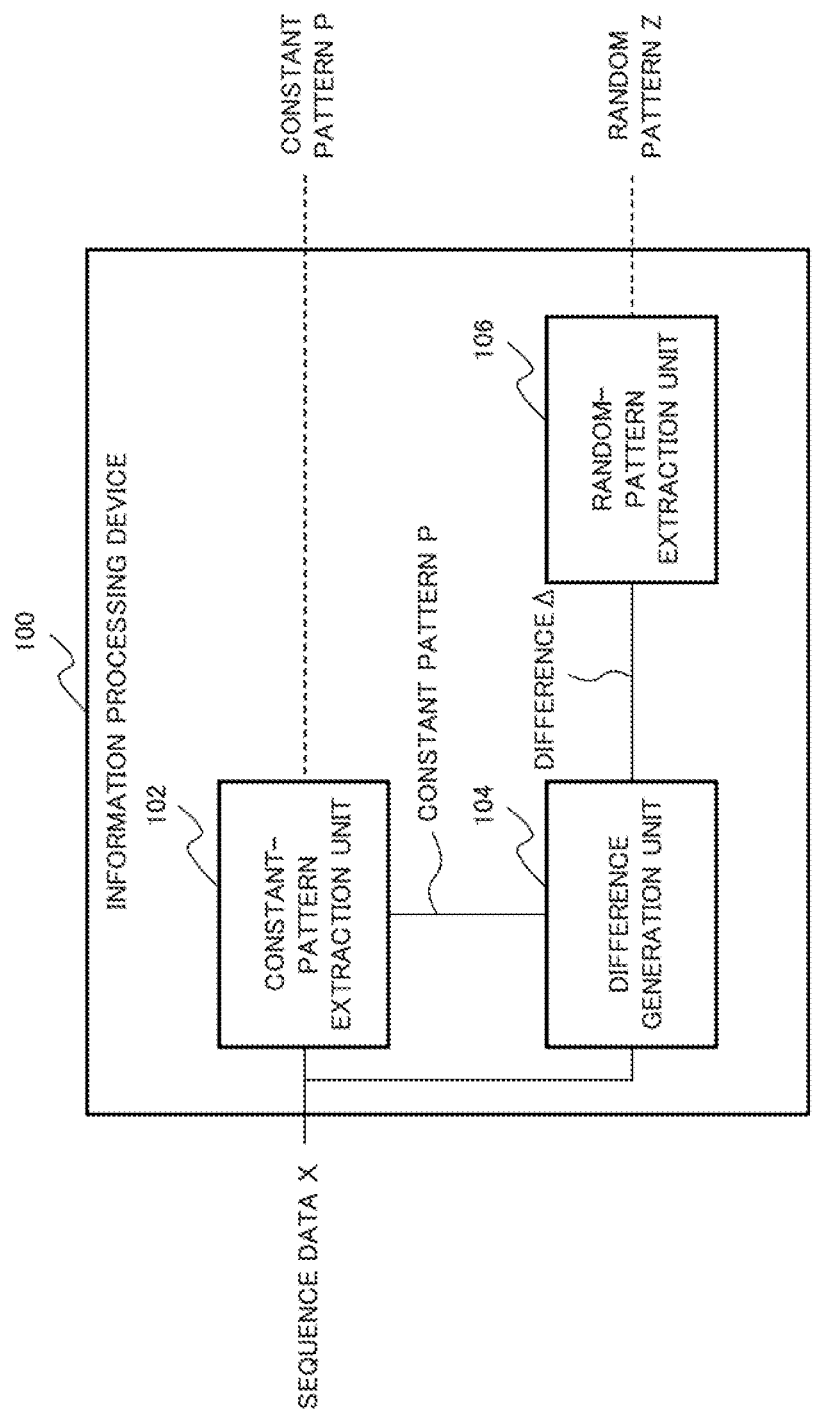
FIG. 1 is a block diagram illustrating one example of a configuration of an information processing device according to a first example embodiment of the present invention.

Hereinafter, with reference to the drawings, an example embodiment of the present invention is described.

Each of the drawings illustrates the example embodiment of the present invention. However, the present invention is not limited to illustration of each of the drawings. Further, similar configurations in the drawings are denoted with the same numerals, and repeated description thereof is omitted in some cases. Further, in the drawings used in the following description, description on configuration of parts that are not relevant to the description of the present invention are omitted and not illustrated in some cases.

First, terms in the description of the present example embodiment are described.

An "observation value" is a value observed with regard to an attribute relevant to predetermined behavior of a monitor target. The observation value is not limited to a value that is directly observed, and may be a value that is indirectly observed (a value acquired by converting a value detected by a sensor or a value calculated based on a plurality of observation values, for example).

The monitor target (hereinafter, also referred to as a "source") is not limited to be single, and may be plural. Further, for each of the monitor targets, an attribute of an observation target is not limited to be single, and may be plural. Moreover, all the monitor targets are not required to have the same attribute. The attribute may differ in at least a part of the monitor targets.

A "time stamp" is information on time at which an observation value is observed. That is to say, the time stamp is information on time in observation. The time stamp may be a time range having a predetermined length as well as a single time.

An observation value and a time stamp are associated with each other.

The information processing device according to each example embodiment receives data containing an observation value and a time stamp, and performs an operation described below. However, the data contain data in at least a plurality of time stamps. In other words, the data are sequence data (time-series data). Moreover, the data contain a plurality of observation values in each of the time stamps. Here, the plurality of observation values have at least any of a plurality of monitor targets or a plurality of attributes. Note that the data may lack a part of the observation values.

In other words, the sequence data contain a plurality of observation values in a plurality of times.

First Example Embodiment

Hereinafter, with reference to the drawings, a first example embodiment is described.

[Description of Configuration]

First, with reference to the drawing, a configuration of an information processing device 100 according to the first example embodiment is described.

FIG. 1 is a block diagram illustrating one example of the configuration of the information processing device 100 according to the first example embodiment of the present invention. As illustrated in FIG. 1, the information processing device 100 includes a constant-pattern extraction unit 102, a difference generation unit 104, and a random-pattern extraction unit 106.

The constant-pattern extraction unit 102 acquires sequence data (hereinafter, referred to as "sequence data X" or simply as "X" in some cases).

A source from which the constant-pattern extraction unit 102 acquires the sequence data X is freely selected. For example, the constant-pattern extraction unit 102 may receive the sequence data X from an external device, not shown. Alternatively, the constant-pattern extraction unit 102 may read out the sequence data X from a storage unit, not shown.

Then, the constant-pattern extraction unit 102 divides the sequence data X into a plurality pieces of data based on time stamps in the sequence data X. Hereinafter, each of the plurality pieces of data acquired by the division is referred to as sub-data.

Then, the constant-pattern extraction unit 102 constructs data (hereinafter, referred to as a tensor) in which the divided pieces of sub-data are stacked.

As described above, the tensor is constructed by stacking the pieces of sub-data. Further, the order of the pieces of sub-data is the same as the order of the sequence data X. Thus, the order of the constructed tensor is "the order of the sequence data X+1". For example, when the order of the sequence data X is an m-order, the order of the tensor is an m+1-order. More specifically, when the sequence data X are a matrix, m is "2", for example. Thus, in this case, the order of the tensor is "3=2+1". Note that such a data format of tensor is a data format that more clearly expresses temporal redundancy of the sequence data.

Note that the sequence data and the tensor are sets of data containing similar observation values. Therefore, hereinafter, the sequence data is referred to as "first data" and the tensor is referred to as "second data" in some cases.

The constant-pattern extraction unit 102 extracts a behavior pattern having temporal constancy (hereinafter, referred to as a "constant pattern") from the tensor as a target. In the following description, the constant pattern is referred to as a "constant pattern P" or simply as "P" in some cases.

The sequence data X are a set of combinations of observation values. The constant pattern P is a pattern having temporal constancy in the sequence data X. The pattern is a combination of observation values. In other words, the constant pattern P is a combination of observation values having temporal constancy in the sequence data X.

Specifically, the constant-pattern extraction unit 102 uses tensor factorization with a constraint to extract a pattern relevant to data having temporal constancy in extraction of the constant pattern P.

Then, the constant-pattern extraction unit 102 transmits the constant pattern P to the difference generation unit 104.

The constant-pattern extraction unit 102 may output the extracted constant pattern P to an external device, not shown. Alternatively, the constant-pattern extraction unit 102 may transmit the extracted constant pattern P to a processing unit, not shown, inside the information processing device 100. Alternatively, the constant-pattern extraction unit 102 may store the extracted constant pattern P in a storage unit, not shown.

The difference generation unit 104 extracts a difference Δ acquired by removing a part relevant to the constant pattern P from the sequence data X. In the description of the present example embodiment, the difference generation unit 104 extracts the difference Δ through use of the same format as that of the sequence data X. For example, when the sequence data X are an m-order tensor, the difference Δ is an m-order tensor. Alternatively, when the sequence data X are a matrix, the difference Δ is a matrix. However, the difference generation unit 104 may use other formats.

The difference generation unit 104 transmits the difference Δ to the random-pattern extraction unit 106.

Note that, similarly to the constant-pattern extraction unit 102, the difference generation unit 104 may acquire the sequence data X. Alternatively, similarly to the constant pattern P, the difference generation unit 104 may receive the sequence data X from the constant-pattern extraction unit 102.

The random-pattern extraction unit 106 extracts a random pattern being a combination of observation values without temporal constancy, based on the difference Δ. Hereinafter, the random pattern is referred to as a "random pattern Z" or simply as "Z" in some cases.

The random-pattern extraction unit 106 may output the extracted random pattern Z to an external device, not shown. Alternatively, the random-pattern extraction unit 106 may transmit the extracted random pattern Z to a processing unit, not shown, inside the information processing device 100. Alternatively, the random-pattern extraction unit 106 may store the extracted random pattern Z in a storage unit, not shown.

Next, with reference to the drawings, an operation of the information processing device 100 is described.

Figure 2:
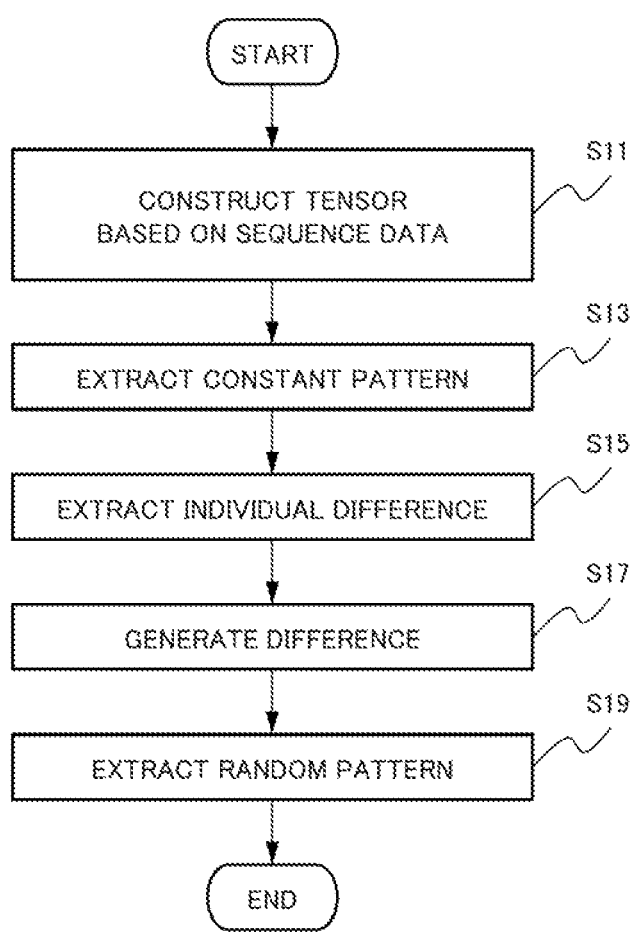
FIG. 2 is a flowchart illustrating one example of an operation of the information processing device according to the first example embodiment.

FIG. 2 is a flowchart illustrating one example of an operation of the information processing device 100 according to the first example embodiment.

First, the constant-pattern extraction unit 102 constructs a tensor based on the sequence data X (Step S11). In detail, first, the constant-pattern extraction unit 102 divides the sequence data X into pieces of sub-data based on time stamps in the sequence data X. Then, the constant-pattern extraction unit 102 construct the tensor by stacking the divided pieces of sub-data.

FIG. 3 is a diagram illustrating one example of the sequence data X. The sequence data X illustrated in FIG. 3 are formed of tuples constituted by (src, day, and msg). Note that the tuple is a general term for a set constituted by a plurality of constituent elements (src, day, and msg, in FIG. 3).

In FIG. 3, the src is information relevant to a monitor target, that is, an information source of data. For example, the src is a source address. For example, when the sequence data X are a log of a computer network, a source address is an Internet Protocol (IP) address of the source.

The day is information on time, that is, a time stamp. For example, the day is a date and/or a time.

The msg is information indicating a type of attribute in the sequence data X. For example, the msg is information indicating a distinction of type (failure content, for example) of predetermined message.

In the case of FIG. 3, each cell indicates how many times each of messages is received. For example, the leftmost and uppermost cell in FIG. 3 is the number of times that a source src1 receives msg1 in a time stamp day 1.

In FIG. 3, a cell with transverse lines and a hatched cell indicate that a value other than 0 is provided. However, in FIG. 3, the number of times is omitted.

Moreover, in FIG. 3, the cell with transverse lines is a cell forming a pattern relevant to behavior having temporal constancy (the constant pattern P). The hatched cell is a cell forming a pattern relevant to random behavior (the random pattern Z).

However, in the first example embodiment, each of the cells is not required to be grasped as the constant pattern P or the random pattern Z in advance. The distinction in FIG. 3 is made for easy understanding of the following description. Further, in the following description, for easy understanding, errors and the like caused in matrix decomposition and tensor decomposition are omitted.

Note that, in FIG. 3, a source and an attribute are indicated as one-dimensional data. However, this is for convenience of the description. In the specific processing in the present example embodiment, the source and/or the attribute may be multi-dimensional data.

The constant-pattern extraction unit 102 divides the sequence data X in FIG. 3 into pieces of sub-data based on the time information day (time stamps).

Figure 4:
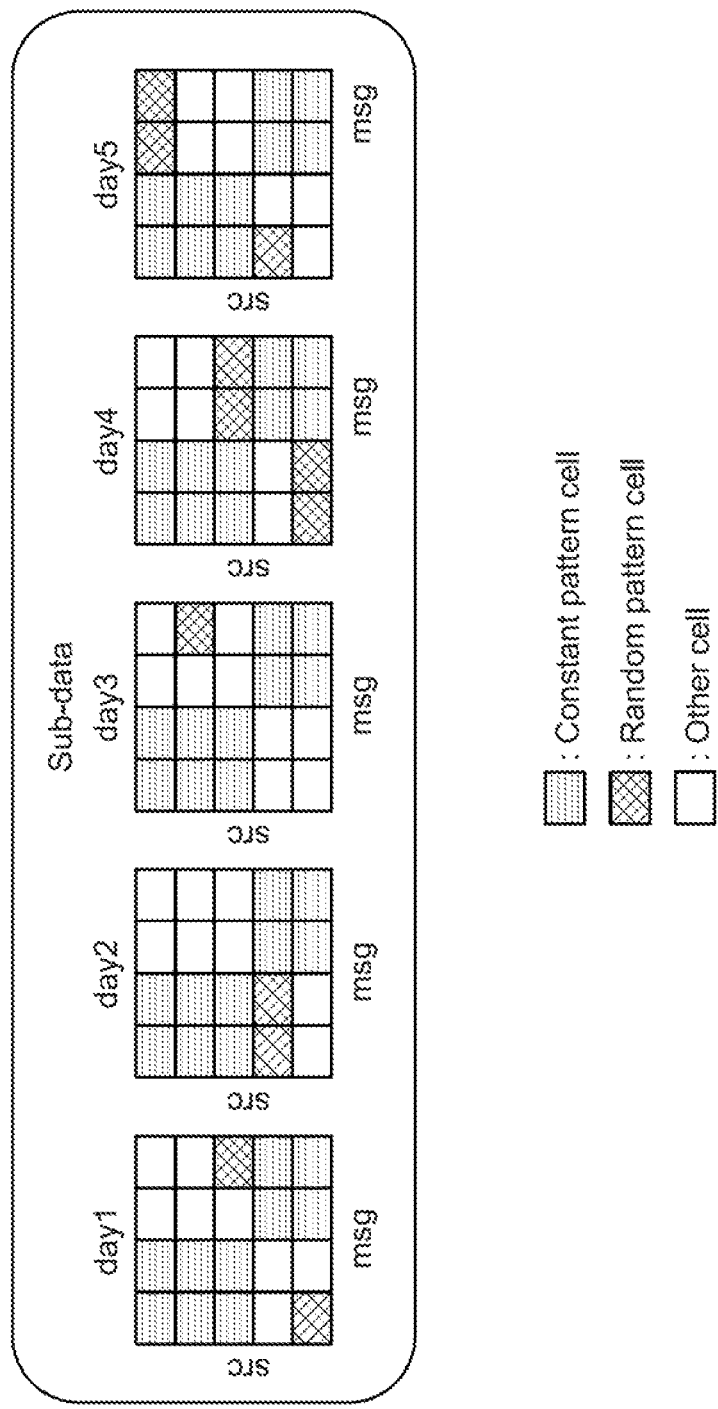
FIG. 4 is a diagram illustrating one example of sub-data.

FIG. 4 is a diagram illustrating one example of the sub-data. As illustrated in FIG. 4, the sub-data are divided with respect to the time information day (time stamps).

Further, the constant-pattern extraction unit 102 constructs the tensor by stacking the sub-data illustrated in FIG. 4 in a time direction.

Figure 5:
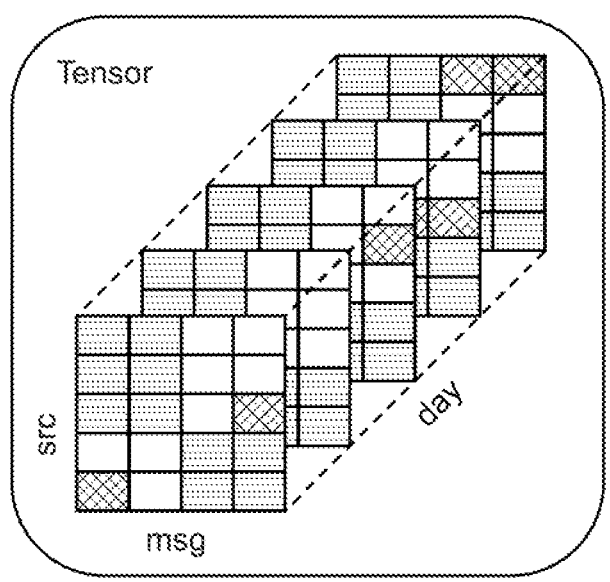
FIG. 5 is a diagram illustrating one example of a constructed tensor.

FIG. 5 is a diagram illustrating one example of the constructed tensor.

The constant-pattern extraction unit 102 extracts the constant pattern P based on the tensor (Step S13). In detail, the constant-pattern extraction unit 102 uses, to the tensor being a target, tensor factorization with a constraint to extract a behavior pattern having temporal constancy.

Figure 6:
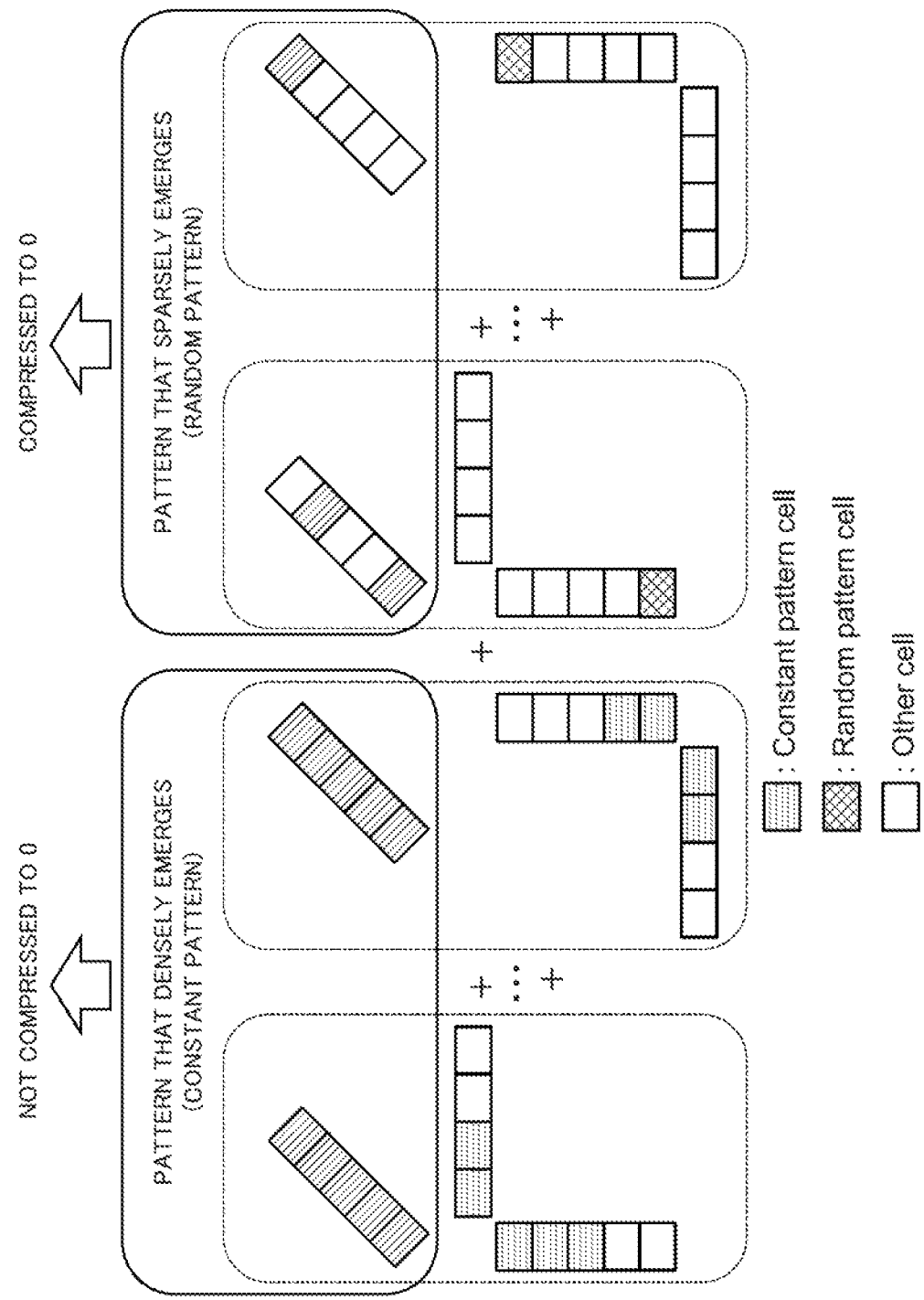
FIG. 6 is a diagram illustrating one example of a pattern acquired based on tensor decomposition.

FIG. 6 is a diagram illustrating one example of the pattern acquired based on the tensor factorization. FIG. 6 illustrates the constant pattern P on the left side and the random pattern Z on the right side.

For easy understanding of the patterns, FIG. 6 illustrates the patterns by classifying into groups with respect to the axes of the tensor. For example, the left end pattern includes msg-axis data being a set of horizontal cells, src-axis data being a set of vertical cells, and day-axis (time stamp, that is, time-axis) data being a set of oblique cells. As illustrated in FIG. 6, the constant pattern P has a dense (a state in which data are present or are present in almost all cells) time axis (an oblique cell). Meanwhile, the random pattern has a sparse (a state in which data are not present or are scarcely present) time axis (an oblique cell).

A specific example of the tensor factorization for acquiring the constant pattern P illustrated in FIG. 6 is described.

The constant-pattern extraction unit 102 uses tensor factorization applied with Sparse regularization as a constraint, in order to extract a behavior pattern having temporal constancy. More specifically, the constant-pattern extraction unit 102 adds, as Sparse regularization, Group Lasso regularization to a day axis (time axis) of the tensor.

Group Lasso regularization is one type of Sparse regularization, and exerts an effect of simultaneously compressing a set of variables configured as a group to 0. This effect (effect of simultaneously compressing the set of variables to 0) occurs when the variables forming a set have similar small values. In other words, when emergence of a constant value is observed for a predetermined number of times or over in a set of variables configured as a group, at least a part of the variables in the group is not compressed to 0 in Group Lasso regularization. Further, in a set of variables with high constancy in which values always emerge, all the variables are not compressed to 0.

The constant-pattern extraction unit 102 can exert different effects with respect to a group of the constant pattern P and a group of the random pattern Z by adding such Group Lasso regularization to tensor factorization. Specifically, the constant-pattern extraction unit 102 compresses variables in a group of the random pattern Z and noise generated randomly to 0 by using Group Lasso regularization. That is to say, the constant-pattern extraction unit 102 prevents the random pattern Z from being detected as a pattern through by using Group Lasso regularization. In this case, also in the constant pattern P, a number of variables are compressed to 0. However, in the constant pattern P, at least a part of variables is not compressed to 0.

The constant-pattern extraction unit 102 may extract a pattern with variables that are always other than 0 (non-zero variables) as the constant pattern P. However, the pattern extracted by the constant-pattern extraction unit 102 is not limited to that described above. For example, the constant-pattern extraction unit 102 may extract, as the constant pattern P, a pattern in which the number of emergence time of a non-zero variable or a ratio of the non-zero variable is more than a predetermined threshold value. The acquired pattern becomes a behavior pattern having temporal constancy (the constant pattern P).

Figure 7:
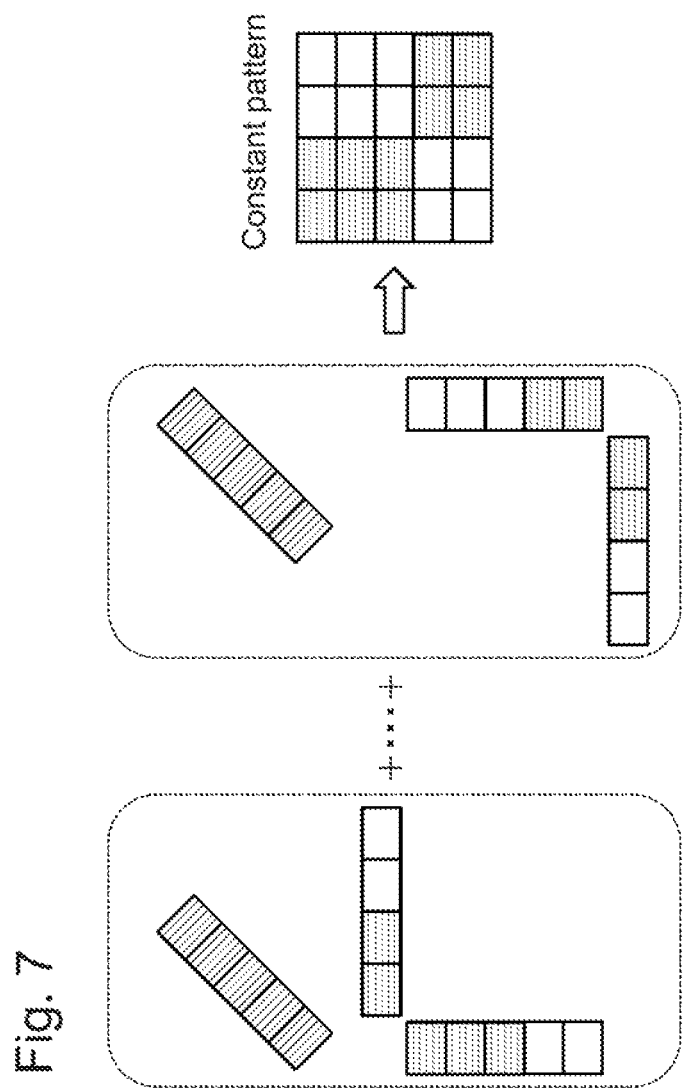
FIG. 7 is a diagram illustrating one example of a constant pattern in FIG. 6.

FIG. 7 is a diagram illustrating one example of the constant pattern P in FIG. 6.

As a method using Group Lasso regularization, Soft-thresholding is known. When using Soft-thresholding, a sparse estimate value ($v_e$), which is sparse by using Group Lasso regularization, for a value v belonging to a variable group g is derived using Equation 1 given below.

$$v_e = \frac{v(\|g\|_2 - \lambda/2)_+}{\|g\|_2} \qquad \text{[Equation 1]}$$

Here, "$(\bullet)_+$" is "$\max(\bullet, 0)$". That is to say, "$(\bullet)_+$" is a value in the brackets when the value in the brackets is positive, and is 0 when the value in the brackets is negative. Further, $\|\bullet\|_2$ is a L2 norm. $\lambda$ is a parameter that determines an effect of regularization, and is a value that is set in advance. That is to say, when the L2 norm of the group g is less than the predetermined value, the estimate value ($V_e$) is 0.

Sequentially, the difference generation unit 104 extracts a difference between the sub-data and the constant pattern P (hereinafter, referred to as an "individual difference $\Delta^*$") (Step S15). The sub-data is data divided in time. Thus, the individual difference $\Delta^*$ is a difference divided in time.

Figure 8:
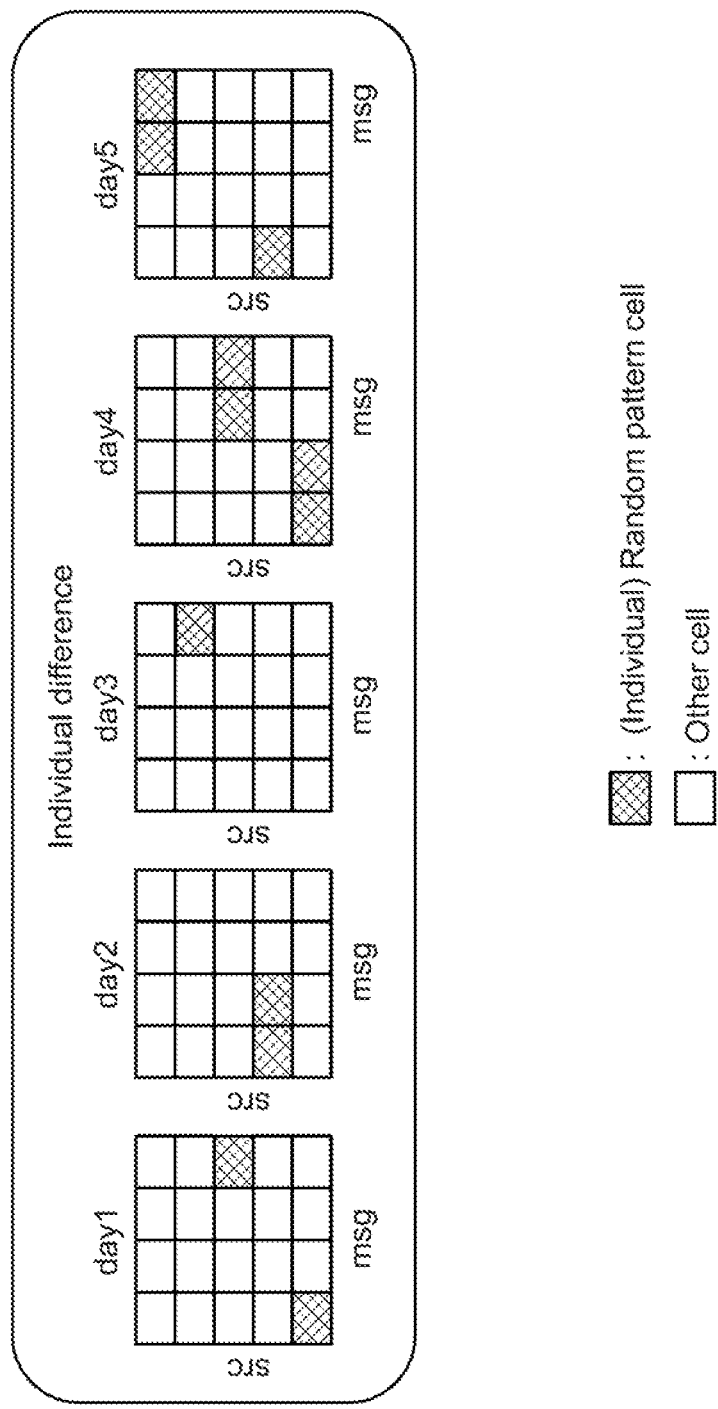
FIG. 8 is a diagram illustrating an individual difference in sub-data.

FIG. 8 is a diagram illustrating one example of the individual difference $\Delta^*$ of the sub-data.

Sequentially, the difference generation unit 104 generates, by performs the predetermined processing on individual difference $\Delta^*$, the difference $\Delta$ that is data in the same format (the format of the tensor) as that of the sequence data X (Step S17). Note that, when the sequence data X are a matrix as illustrated in FIG. 3, the processing is generally processing called matricization. The difference $\Delta$ is a temporal difference between the sequence data X and the constant pattern P.

Figure 9:
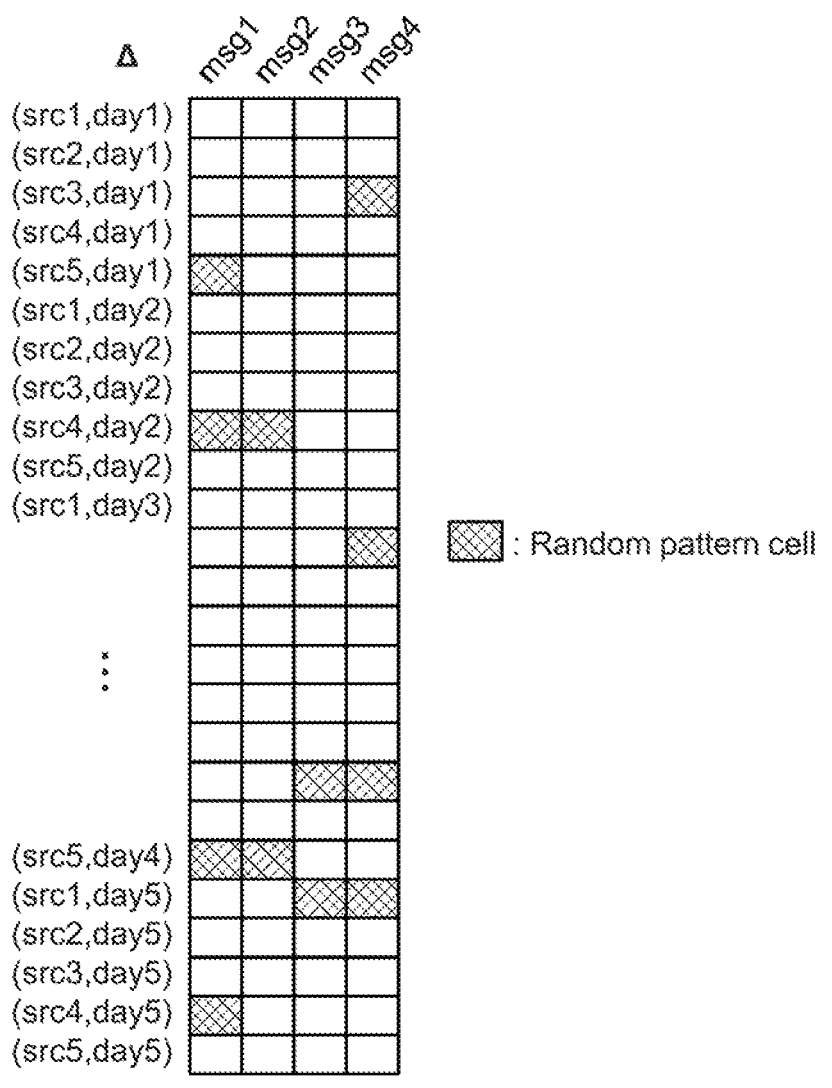

FIG. 9 is a diagram illustrating a difference $\Delta$ acquired by matricizing the individual difference $\Delta^*$ illustrated in FIG. 8.

Further, the random-pattern extraction unit 106 extracts the random pattern Z based on the difference $\Delta$ (Step S19). A technique used by the random-pattern extraction unit 106 is freely selected. For example, the random-pattern extraction unit 106 extracts the random pattern Z by using, to the difference $\Delta$, an analysis technique such as matrix decomposition using a sparse estimate value, frequent-item set extraction, and clustering. Here, for example, matrix decomposition is singular value decomposition, non-negative matrix factorization, or the like.

Figure 10:
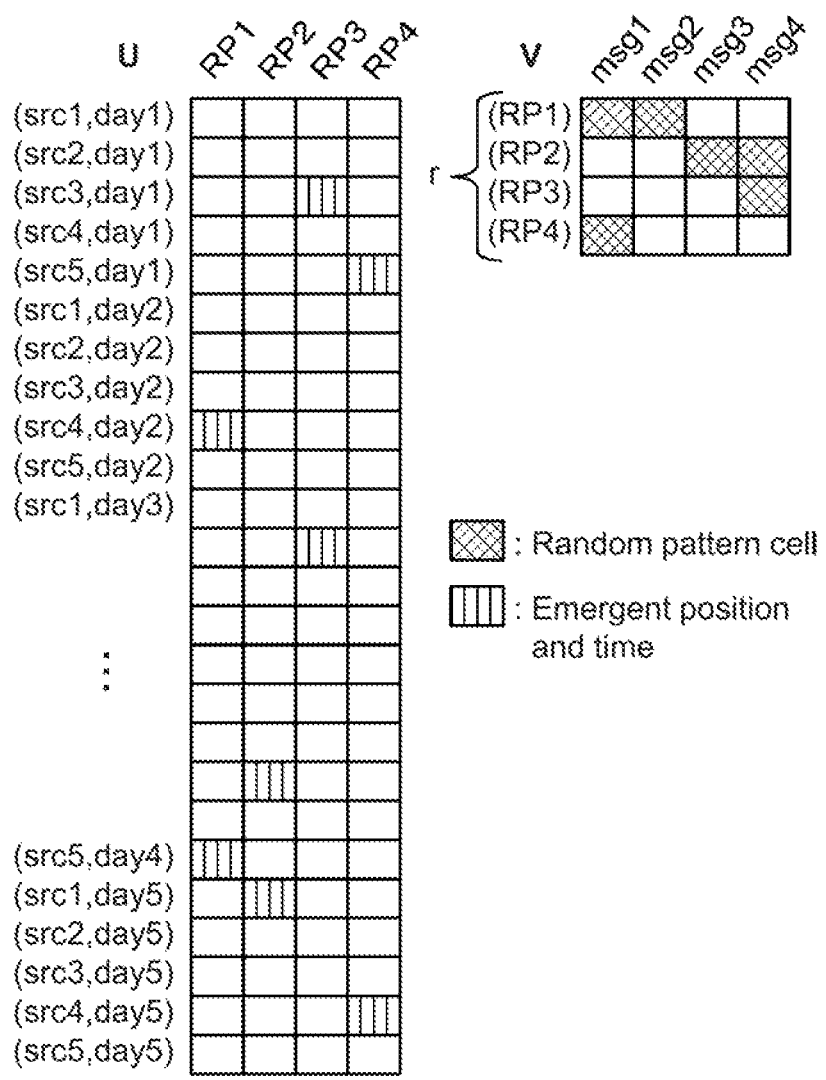
FIG. 10 is a diagram illustrating one example of a result acquired by applying matrix decomposition to the difference illustrated in FIG. 9.

FIG. 10 is a diagram illustrating one example of a result acquired by applying matrix decomposition using a sparse estimate value to the difference $\Delta$ illustrated in FIG. 9. The random-pattern extraction unit 106 divides the difference $\Delta$ into two matrices (U and V).

In FIG. 10, the matrix V is a set of the random patterns Z (PR1 to PR4). Each line of the matrix V is the random pattern Z. Hereinafter, when there is no need to distinguish the random patterns Z from one another in the description, the term "random pattern Z" is used including a case of a plurality of (a set of) random patterns Z.

Further, the matrix U indicates an emergence position of the random pattern Z (src1 to 5 in FIG. 10), time (day1 to 5 in FIG. 10), and the random pattern Z that emerges (PR1 to 4 in FIG. 10). Specifically, in the cells provided with vertical lines in the matrix U, the random pattern Z emerges. In the following description, the matrix U is also referred to as "emergence information".

For example, emergence information in the third line of the matrix U indicates that the third random pattern Z (PR3) emerges in a source src3 at a time day1.

Note that, in FIG. 10, r is the number of extracted random patterns Z. r depends on the attribute number of data (the number of lines in FIG. 3, for example) and ranks (orders) of the tensor. The difference $\Delta$ illustrated in FIG. 9 has four msgs as attributes. Thus, the maximum for number (r) of the random pattern Z is "4". FIG. 10 illustrates an example in which random patterns Z are extracted to the maximum number of r. However, the value of r is not limited to the maximum number. The value r may be set in advance to a freely selected number from 1 to a maximum number.

Note that the constant-pattern extraction unit 102 extracts the constant pattern P. Thus, data being a target of the constant-pattern extraction unit 102 (the sequence data X, in this case) is required to have temporal redundancy.

On the other hand, the random-pattern extraction unit 106 extracts the random pattern Z (a pattern relevant to data without temporal constancy). Thus, the data being a target of the random-pattern extraction unit 106 is not necessarily required to have temporal redundancy. Behavior without temporal constancy emerges less frequently and emerges at irregular positions in most cases. Thus, it is preferred that the data being a target of the random-pattern extraction unit 106 contain a number of tuples. Thus, the random-pattern extraction unit 106 may use other data in addition to the difference $\Delta$.

[Description of Effects]

As described above, the information processing device 100 according to the first example embodiment can exert an effect of extracting a pattern relevant to behavior having temporal constancy and a pattern relevant to random behavior.

The reasons for this are given below.

The constant-pattern extraction unit 102 constructs a tensor (second data) that is acquired, based on sequence data X (first data) containing a plurality of observation values in a plurality of times, by stacking the sequence data X (the first data) with respect to the times. Further, the constant-pattern extraction unit 102 extracts a constant pattern P that is a combination of the observation values having temporal constancy in the sequence data X (the first data), based on the tensor (the second data). Further, the difference generation unit 104 generates a temporal difference $\Delta$ between the sequence data X (the first data) and the constant pattern P. Further, the random-pattern extraction unit 106 extracts a random pattern Z that is a combination of the observation values without temporal constancy, based on the difference $\Delta$.

As described above, in the information processing device 100, the constant-pattern extraction unit 102 firstly constructs the tensor acquired by stacking of the sequence data X, which contain a plurality of observation times in a plurality of times, with respect to times. Thus, in the constructed tensor, temporal redundancy is clear. Further, the constant-pattern extraction unit 102 extracts the constant pattern P based on the tensor. In other words, the constant-pattern extraction unit 102 extracts the constant pattern P by using the tensor with clear temporal redundancy, and hence, it is possible to extract the constant pattern P relevant to the behavior having temporal constancy.

Further, the difference generation unit 104 generates the difference $\Delta$ that is a temporal difference between the sequence data X and the constant pattern P. The constant pattern P is extracted through use of temporal redundancy. Thus, the difference $\Delta$ is data without temporal constancy as a result of considering temporal redundancy.

Further, the random-pattern extraction unit 106 extracts the random pattern Z without temporal constancy by using the difference $\Delta$. The difference $\Delta$ is data generated in consideration of temporal redundancy. Thus, as a result of considering temporal redundancy, the random-pattern extraction unit 106 can extract the random pattern Z relevant to behavior without temporal constancy, As described above, the information processing device 100 can extract the constant pattern P relevant to the behavior having temporal constancy and the random pattern Z relevant to the random behavior.

[Configuration of Hardware]

The information processing device 100 described above is configured as in the following. For example, each of the components of the information processing device 100 may be configured by hardware circuits. Alternatively, in the information processing device 100, each of the components may be configured through use of a plurality of devices connected to one another via a network. Alternatively, the information processing device 100 may be configured with one piece of hardware for a plurality of components.

Alternatively, the information processing device 100 may be achieved as a computer device including a central processing unit (CPU), a read only memory (ROM), and a random access memory (RAM). In addition to the above-mentioned configuration, the information processing device 100 may be achieved as a computer device further including an input and output circuit (IOC). Alternatively, in addition to the above-mentioned configuration, the information processing device 100 may be achieved as a computer device further including a network interface circuit (NIC).

Figure 11:
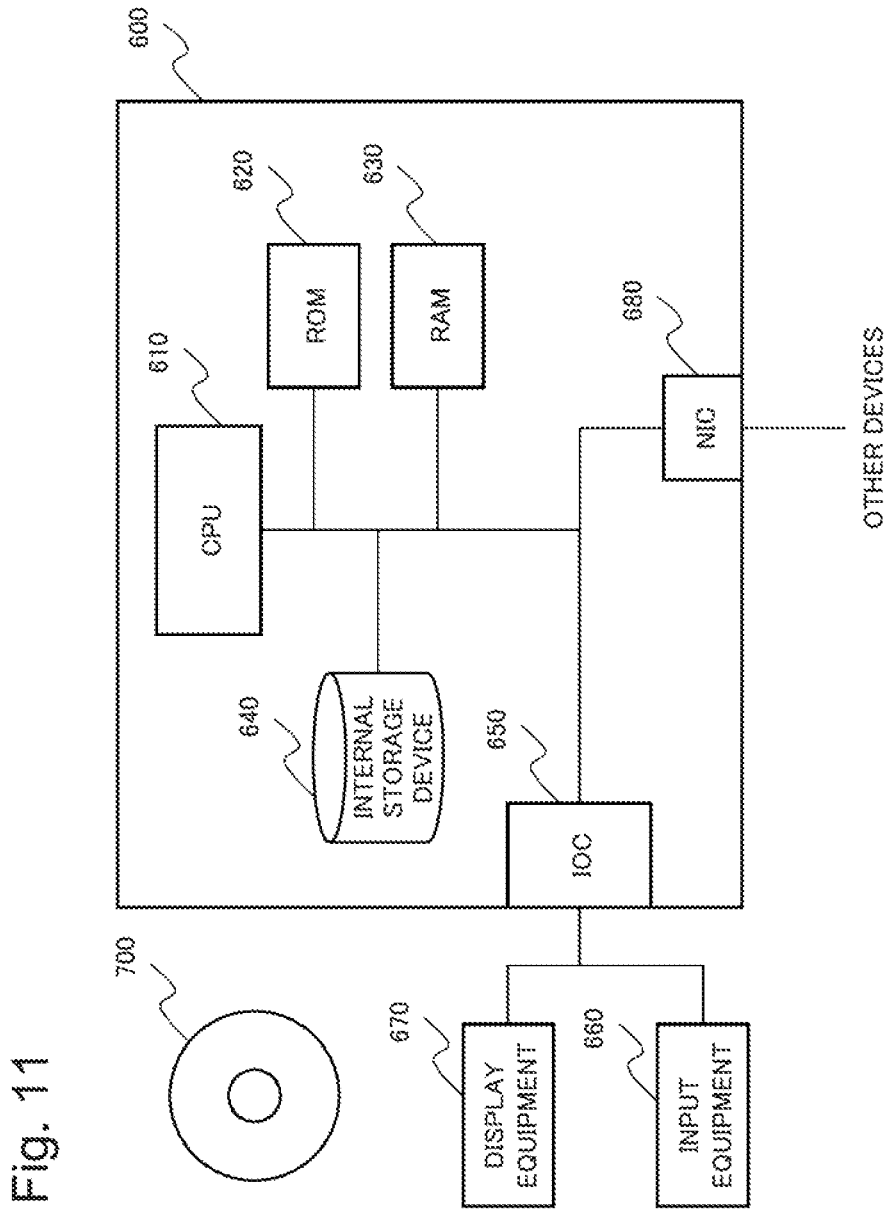
FIG. 11 is a block diagram illustrating one example of a hardware configuration.

FIG. 11 is a block diagram illustrating a configuration of an information processing device 600 being one example of a hardware configuration of the information processing device 100.

The information processing device 600 includes a CPU 610, a ROM 620, a RAM 630, an internal storage device 640, an IOC 650, and an NIC 680, and forms a computer device.

The CPU 610 reads a program from the ROM 620. Then, the CPU 610 controls the RAM 630, the internal storage device 640, the IOC 650, and the NIC 680 based on the read program. Therefore, the computer device including the CPU 610 controls those configurations and achieves the functions of the constant-pattern extraction unit 102, the difference generation unit 104, and the random-pattern extraction unit 106, which are illustrated in FIG. 1.

When achieving the functions, the CPU 610 may use the RAM 630 and/or the internal storage device 640 as temporarily memory for the program.

Alternatively, the CPU 610 may read the program contained in a recording medium 700, which stores the program in a computer readable manner, through use of a recording medium reading device, not shown. Alternatively, the CPU 610 may receive the program from an external device, not shown, via the NIC 680, store the program in the RAM 630, and operate based on the stored program.

The ROM 620 stores the program executed by the CPU 610 and fixed data. The ROM 620 is a programmable-ROM (P-ROM) or a flash ROM, for example.

The RAM 630 temporarily stores the program executed by the CPU 610 and data (the data on the patterns illustrated in FIG. 4 to FIG. 10 described above and other working data, for example). For example, the RAM 630 is a Dynamic-RAM (D-RAM).

The internal storage device 640 stores data and the program that are stored in the information processing device 600 for a long period of time. Further, the internal storage device 640 may operate as a temporary storage device for the CPU 610. For example, the internal storage device 640 is a hard disk drive, a magneto-optic disk drive, a solid state drive (SSD), or a disk array device.

Here, each of the ROM 620 and the internal storage device 640 is a non-transitory recording medium. Meanwhile, the RAM 630 is a transitory recording medium. Further, the CPU 610 is operable based on the program stored in the ROM 620, the internal storage device 640, or the RAM 630. That is to say, the CPU 610 is operable through use of a non-transitory recording medium and/or a transitory recording medium.

The IOC 650 mediates data between the CPU 610, and input equipment 660 and display equipment 670. For example, the IOC 650 is an IO interface card or a universal serial bus (USB) card. Moreover, the IOC 650 is not limited to wired one such as a USB, and may be wireless one.

The input equipment 660 receives an input instruction from an operator of the information processing device 600. For example, the input equipment 660 is a keyboard, a mouse, or a touch panel.

The display equipment 670 displays information for an operator of the information processing device 600. For example, the display equipment 670 is a liquid-crystal display. The display equipment 670 may display the constant pattern P and/or the random pattern Z.

The NIC 680 intermediates interaction of data with an external device, not shown, via a network. For example, the NIC 680 is a local area network (LAN) card. Moreover, the NIC 680 is not limited to wired one, and may be wireless one. As a part of the constant-pattern extraction unit 102, the NIC 680 may receive the sequence data X. Alternatively, as a part of the constant-pattern extraction unit 102 and/or the random-pattern extraction unit 106, the NIC 680 may output the constant pattern P and/or the random pattern Z.

The information processing device 600 configured as described above can exert similar effects as those exerted by the information processing device 100.

The reason for this is because the CPU 610 of the information processing device 600 achieves a similar function as that of the information processing device 100 based on the program.

[Description of System]

Next, with reference to the drawing, an information processing system 10 including the information processing device 100 according to the present example embodiment is described.

FIG. 12 is a diagram illustrating one example of a configuration of the information processing system 10 according to the first example embodiment. The information processing system 10 includes the information processing device 100 according to the first example embodiment, a monitor target 200, and a display device 300.

The monitor target 200 is a supply source of the sequence data X being a processing target of the information processing device 100. The monitor target 200 is freely selected. For example, the monitor target 200 may be a predetermined factory. In this case, the sequence data X contain, as observation values, attributes (a temperature, a pressure, a flow rate, an oscillation, and the like) of facilities in a factory. Alternatively, the monitor target 200 is a computer network including a plurality of computers. In this case, the sequence data X are a log containing, as observation values, data transmitted or received via the network (a packet, for example) and states of the computers, for example. FIG. 12 illustrates those cases.

The information processing device 100 acquires the sequence data X from the monitor target 200. Further, the information processing device 100 extracts the random pattern Z based on the above-mentioned operation. Further, the information processing device 100 transmits the random pattern Z to the display device 300.

The display device 300 displays the received random pattern Z. As a result, a user of the information processing system 10 can grasp the pattern of the observation values without temporal constancy (the random pattern Z).

Note that the information processing device 100 may transmit, to the display device 300, other information such as emergence position information, the constant pattern P, and/or the sequence data X. In this case, the display device 300 displays, in addition to the random pattern Z, the emergence information, the constant pattern P, and/or the sequence data X.

For example, when the display device 300 displays the random pattern Z and the constant pattern P, a user of the information processing system 10 can grasp the random pattern Z more appropriately based on comparison with the constant pattern P.

Alternatively, for example, when the display device 300 displays the random pattern Z and the emergence information, a user of the information processing system 10 can grasp, in addition to the random pattern Z, the emergence position and time of the random pattern Z and a type of the random pattern Z.

Note that the display device 300 is not limited to an external device of the information processing device 100, and may be included in the information processing device 100.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Information processing system
100 Information processing device
102 Constant-pattern extraction unit
104 Difference generation unit
106 Random-pattern extraction unit
200 Monitor target
300 Display device
600 Information processing device
610 CPU
620 ROM
630 RAM
640 Internal storage device
650 IOC
660 Input equipment
670 Display equipment
680 NIC
700 Recording medium

What is claimed is:

1. An anomaly detection device comprising:
one or more memories storing instructions; and
one or more processors configured to execute the instructions to:
acquire, from an observation device, first data indicating attributes observed at an observation device for each of a plurality of time periods;
generate second data by stacking the first data with respect to the plurality of time periods;
identify, based on the second data, a constant pattern that is a combination of the attributes having temporal constancy;

remove the constant pattern from the first data to generate a difference;

identify, based on the difference, a random pattern that is a combination of the attributes having temporal variability; and output a signal for controlling a display device to display the random pattern to the display device.

2. The anomaly detection device according to claim 1, wherein the observation device is one among a plurality of observation devices providing the first data.

3. The anomaly detection device according to claim 1, wherein the attributes indicate a physical value of the observation device.

4. The anomaly detection device according to claim 1, wherein the first data indicates a communication state of the observation device.

5. An anomaly detection method comprising:

acquiring, from an observation device, first data indicating attributes observed at an observation device for each of a plurality of time periods;

generating second data by stacking the first data with respect to the plurality of time periods;

identifying, based on the second data, a constant pattern that is a combination of the attributes having temporal constancy;

removing the constant pattern from the first data to generate a difference;

identifying, based on the difference, a random pattern that is a combination of the attributes having temporal variability; and outputting a signal for controlling a display device to display the random pattern to the display device.

6. The anomaly detection method according to claim 5, wherein the observation device is one among a plurality of observation devices providing the first data.

7. The anomaly detection method according to claim 5, wherein the attributes indicate a physical value of the observation device.

8. The anomaly detection method according to claim 5, wherein the first data indicates a communication state of the observation device.

9. A non-transitory computer-readable recording medium embodying a program, the program causing a computer to perform an anomaly detection method, the anomaly detection method comprising:

acquiring, from an observation device, first data indicating attributes observed at an observation device for each of a plurality of time periods;

generating second data by stacking the first data with respect to the plurality of time periods;

identifying, based on the second data, a constant pattern that is a combination of the attributes having temporal constancy;

removing the constant pattern from the first data to generate a difference;

identifying, based on the difference, a random pattern that is a combination of the attributes having temporal variability; and outputting a signal for controlling a display device to display the random pattern to the display device.

* * * * *